Jan. 11, 1944.   H. H. METCALF   2,338,955
AUTOMOBILE CARRIER
Filed Oct. 21, 1940   2 Sheets-Sheet 1

Hollis H. Metcalf   Inventor

Attorney

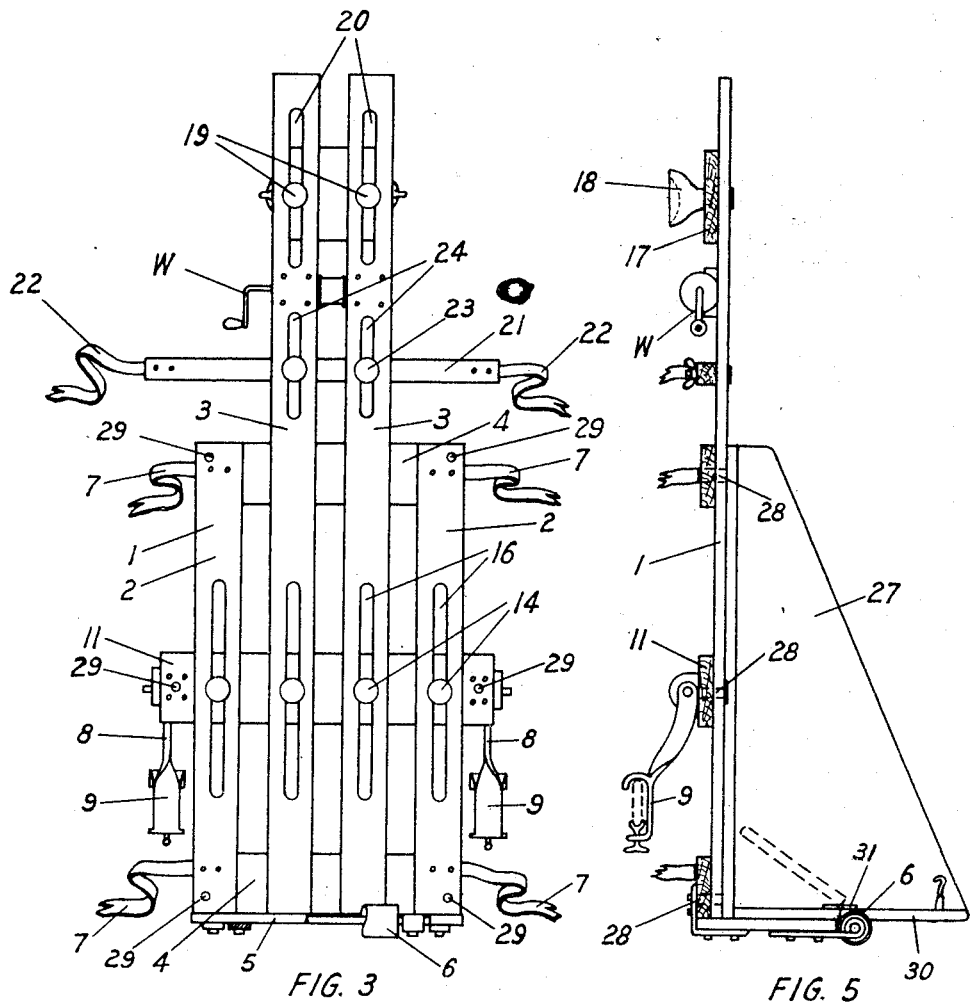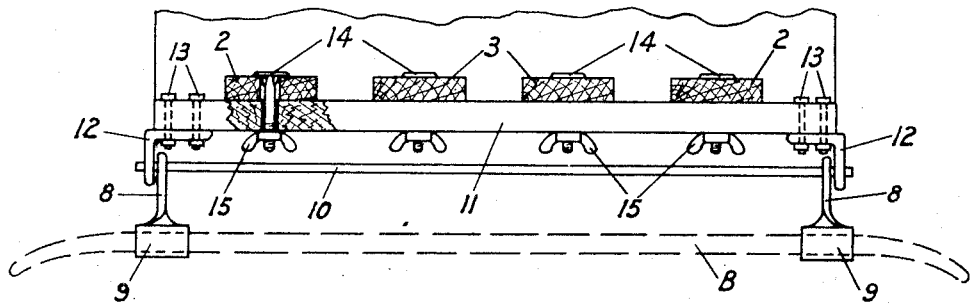

Patented Jan. 11, 1944

2,338,955

UNITED STATES PATENT OFFICE 2,338,955

AUTOMOBILE CARRIER

Hollis H. Metcalf, Shreveport, La., assignor to Algernon F. Flournoy, Shreveport, La.

Application October 21, 1940, Serial No. 362,115

4 Claims. (Cl. 224—29)

My invention relates to automobile carriers.

An object of my invention is to provide a carrier that may be attached to and supported by the rear bumper of an automobile.

Another object of my invention is to provide a carrier designed to be supported by the rear bumper of an automobile and rest on the back of an automobile with an arrangement whereby the carrier may be brought to a vertical position to facilitate the loading and unloading of the carrier.

Another object of my invention is to provide a carrier designed to be supported by the rear bumper of an automobile with removable side boards and a tail board for making it into a bin type carrier.

Another object of my invention is to provide a carrier with a cabinet structure for carrying salesmen's samples or other merchandise.

Another object of my invention is to provide an automobile carrier adapted to be lowered down to the ground to facilitate the loading and unloading of the carrier.

Other objects and advantages of my invention will become apparent to the reader in the course of my detailed description to follow of the structures embodying my invention illustrated by the drawings.

In the drawings,

Figure 3 is a plan view of my carrier.

Figure 4 is a cross sectional view of my carrier showing details of the arrangement for fastening the carrier to the rear bumper of an automobile.

Figure 5 is a side view of my carrier shown converted into a bin type carrier.

Figure 1:
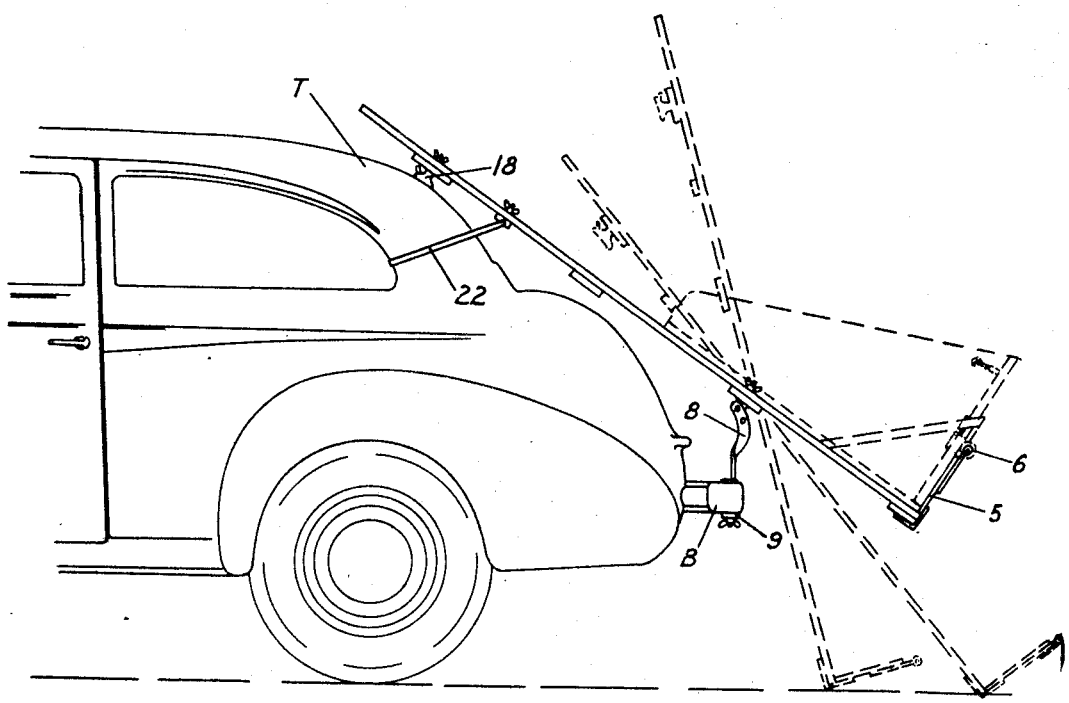
Figure 1 is a side view of my invention shown attached to an automobile in the carrying position.
Figure 2:
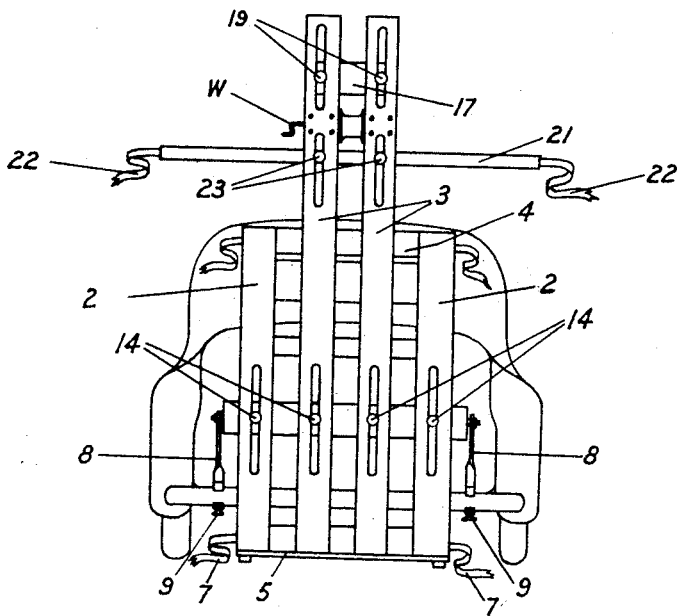
Figure 2 is a rear view of my carrier shown attached to an automobile with carrier revolved to the loading position.

In the carrier illustrated by Figure 1 to Figure 5 numeral 1 designates generally the floor of my carrier. The floor 1 is made up of two side slats 2 and two center slats 3, joined together in a spaced relationship on cross members 4. While I show the floor 1 of my carrier made out of slats, it is to be understood that this is done merely for the purpose of making the carrier light and that my inventive concept of the carrier includes the making of solid floor carriers also.

I provide a tail board 5 at the lower end of my carrier to assist in supporting the load carried by the carrier. I provide a roller 6 on the upper edge of the tail board 5 to facilitate the loading of heavy objects into the carrier, such as boats, timber, or the like. By means of the roller 6 a boat, for example, can be slid onto the carrier in its extended loading position, as shown in Figure 1, without injury either to the bottom of the boat or without straining the tail board 5. When a load is placed in the carrier the carrier load fastening straps 7 are useful in strapping the load down to the floor 1 of the carrier to keep it from bouncing out.

The construction described thus far, which constitutes the carrier structure proper, is designed to be supported on the rear of an automobile at two points, the bumper B and the top T. The supporting structure at the bumper B of the automobile is composed of a pair of brackets 8 with clamps 9 adapted to clamp the brackets to the bumper B on the automobile.

Through the upper ends of the brackets 8 I extend a rod 10 on which the carrying block 11 is rotatably mounted by means of angle lugs 12. The angle lugs 12 are bolted to the carrier block by means of bolts 13. The angle lugs 12 are provided with holes slightly larger than the rod 10 to allow them and the carrier block 11, to which they are attached, to turn freely. The carrier body proper as above described is adjustably attached on the carrier blocks 12 by means of the flat head bolts 14 and wing nuts 15 which extend through the carrier block 11 and slots 16 in the floor 1 of the carrier proper. It is by the means of the rotatable mounting of the carrier proper on the brackets 8 that my carrier may be revolved to the earth, contacting a nearly vertical position as shown by the dotted line position in Figure 1. It is by means of the longitudinal adjustment feature of the mounting of my carrier proper on the carrier block 11, made possible by the slots 16, bolts 14 in the slots 16, and wing nuts 15 on the bolts 14, together with the rotatable mounting feature that enables me to position my carrier in the extended earth contacting position shown by dotted lines in Figure 1. To prevent the carrier from scarring the paint on the top of an automobile, on which the carrier also touches, I provide a resting block 17 with a pair of vacuum cups 18 which act as cushions. It is to be understood here, however, that any other form of cushion may be used, within the scope of my invention.

The resting block 17 is longitudinally adjustably mounted to the floor 1 on the carrier by means of flat headed bolts 19 whose shanks extend through slots 20 in the upper end of the center slats 3. The resting block 17 is purposely adjustably mounted to the floor 1 of the carrier to allow it to be positioned to fit correctly on the particular automobile on which the carrier is mounted. In the carrying position my carrier bridges over a luggage compartment, spare tire, or the light structure on the rear of automobile bodies.

To prevent the carrier itself from bouncing up in rough travel, I provide a carrier holding bar 21 with carrier holding straps 22 designed to fasten around the top of an automobile through the rear windows of the automobile as shown in Figure 1, or to fasten to the running board, fenders, or other parts of the automobile. The carrier holding bar is adjustably mounted to the body 1 of the carrier by means of flat headed bolts 23, which extend through slots 24 in the center slats 3.

I provide a winch W as a part of my carrier, as shown in Figure 3 and Figure 5, attached to slats 3 and 4 of the floor 1 of the carrier for use in sliding heavy loads onto the carrier. For example, if it is desired to load a heavy boat onto the carrier, the carrier is positioned in an extended earth contacting position, as shown by the dotted lines in Figure 1. A rope or cable may be wound around the winch and attached to the boat. Then by turning the winch the boat may be drawn up over the roller 6 of the tail board 5 of the carrier.

The carrier, as above described and illustrated in Figures 1 to 5, is designed to be converted into a bin type carrier by means of a pair of side boards 27 with pins 28 adapted to fit into sockets 29 in the floor 1 of the carrier and into the tail board 30, when used with the auxiliary folding tail board 30, as shown in solid lines in Figure 5 and dotted lines in Figure 1. The tail board 30 is hinged in its middle by means of hinges 31 so that it may be used alone to make a flat carrying surface for carrying a chicken coop, or the like, as see the dotted line position of the upper part of the tail board in Figure 1 and Figure 5.

Where fine material is to be carried with my bin type carrier, as described above, the slatted floor of the carrier should be covered with boards, canvas, or the like, to prevent the fine material from sifting through the bottom.

Having thus described my invention, I claim:

1. A carrier adapted to be mounted on the rear of an automobile or the like, comprising a floor member, a foldable tailboard extending crosswise of and upwardly from the lower end of the floor member, a supporting bracket adapted to clamp an automobile bumper or the like and rotatably attached to a carrier block, said carrier block being fastened to the floor member with a clamping means extending through slots in the floor member whereby the carrier block may be longitudinally adjusted with respect to the floor member and a resting block adapted to rest on the top of an automobile or the like, said resting block being attached to the under side of the floor member near its upper end.

2. The carrier as claimed in claim 1 wherein a carrier holding bar is adjustably attached to the floor member, said carrier holding bar being provided with a carrier holding strap adapted to be fastened to an automobile or the like.

3. The carrier as claimed in claim 1 wherein the tailboard is made in two parts longitudinally hinged together along a line running crosswise of the tailboard below the center of the tailboard making the upper part of the tailboard wider than the lower part of the tailboard whereby the upper part of the tailboard may be folded over and rest on the floor member to provide an approximately horizontally extending carrying surface when the floor member is in a slanting position when the carrier is mounted on the rear of an automobile or the like.

4. The carrier as claimed in claim 1 being provided with a pair of spaced side wall members attached to the tailboard and the floor member to provide a bin carrying space on the carrier.

HOLLIS H. METCALF.